(12) United States Patent
Oh

(10) Patent No.: US 6,396,550 B1
(45) Date of Patent: May 28, 2002

(54) METHOD AND DEVICE FOR PRECISION TUNING, AND METHOD AND DEVICE FOR MATCHING VESTIGIAL SIDEBAND SIGNAL IN TELEVISION

(75) Inventor: Ji-Sung Oh, Songnam-shi (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/434,178

(22) Filed: Nov. 5, 1999

(51) Int. Cl.[7] .................................................. H04N 5/50
(52) U.S. Cl. ........................................ 348/735; 348/731
(58) Field of Search ................................. 348/731–733, 348/735, 725, 726; 455/164.1, 169.1, 180.3, 182.3, 192.1, 193.1, 192.3, 192.2; H04N 5/50

(56) References Cited

U.S. PATENT DOCUMENTS

| | | | |
|---|---|---|---|
| 4,261,016 A | * | 4/1981 | Hongu et al. ............... 348/731 |
| 4,385,315 A | * | 5/1983 | George et al. .............. 348/731 |
| 4,891,708 A | * | 1/1990 | Baba .......................... 348/735 |
| 4,975,775 A | * | 12/1990 | Satoh .......................... 348/731 |
| 5,452,015 A | | 9/1995 | Hulyalkar |
| 5,570,136 A | | 10/1996 | Kim |
| 6,154,505 A | * | 11/2000 | Konishi et al. ............. 375/321 |

FOREIGN PATENT DOCUMENTS

WO 95/26101 9/1995 .......... H04N/5/455

* cited by examiner

Primary Examiner—Victor R. Kostak
(74) Attorney, Agent, or Firm—Sughrue Mion, PLLC

(57) ABSTRACT

The present invention pertains to a method and device for precision tuning and a method and device for matching a vestigial sideband signal in a television, which prevent a direct current boost-up when a vestigial sideband signal is shifted to a base band in a carrier recovery device of a short loop using a digital frequency and phase locked loop. A precision tuning method in a television includes the steps of receiving a plurality of vestigial sideband signals in a radio frequency band, shifting only a vestigial sideband signal of an intended channel to be tuned among the plurality of vestigial sideband signals to a base band, outputting the baseband-shifted vestigial sideband signal, generating a direct current estimated value by taking an average of the baseband-shifted vestigial sideband signal, and controlling a tuning frequency of a tuner based on the direct current estimated value.

8 Claims, 8 Drawing Sheets

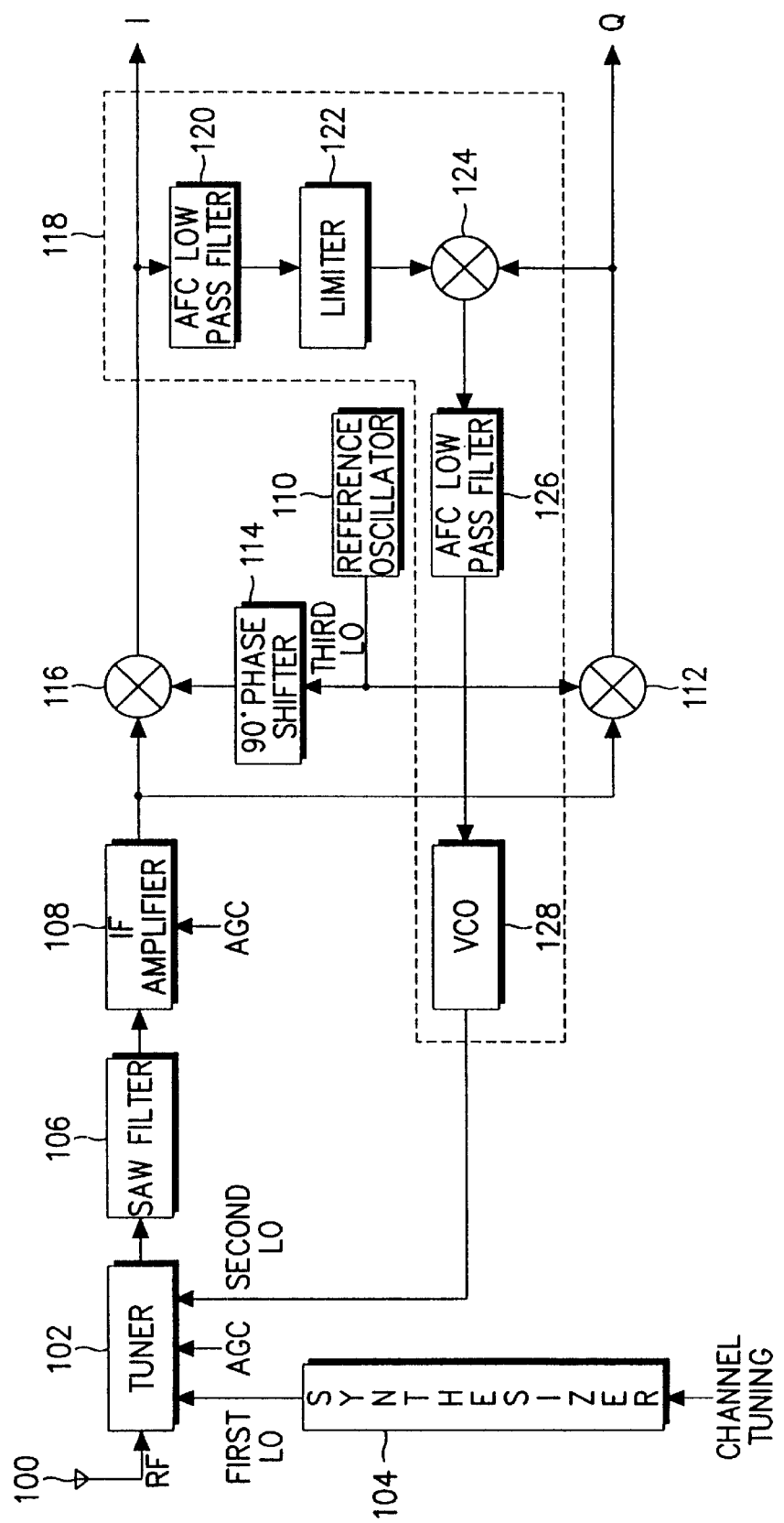

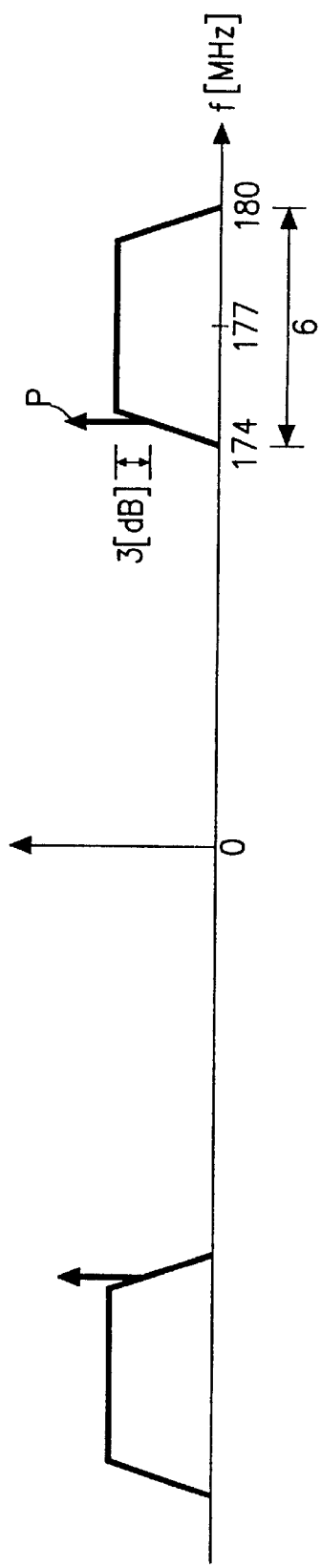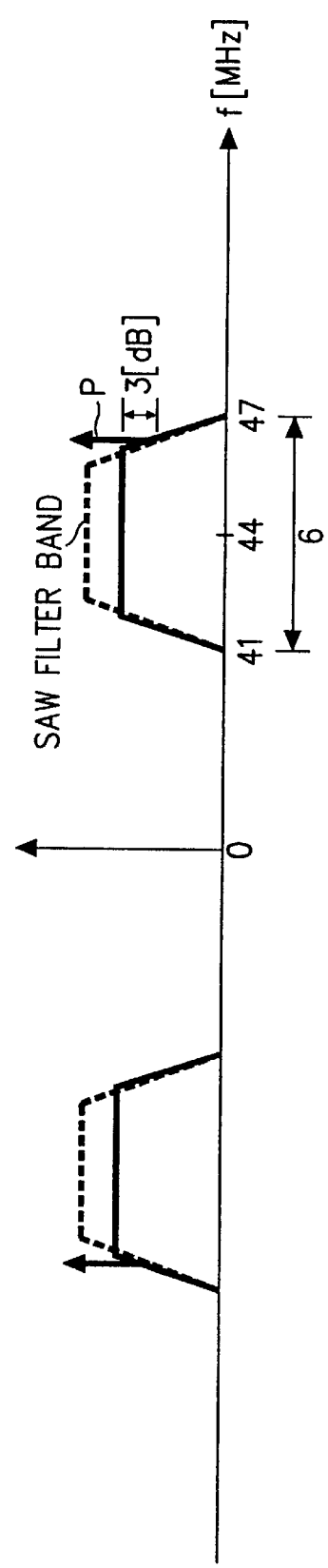

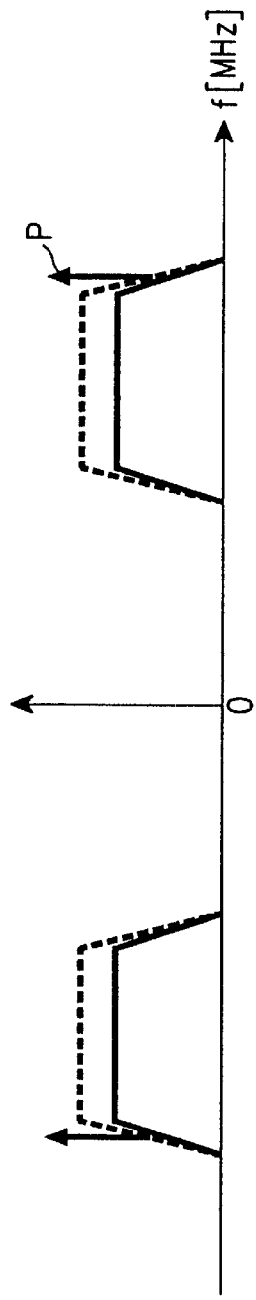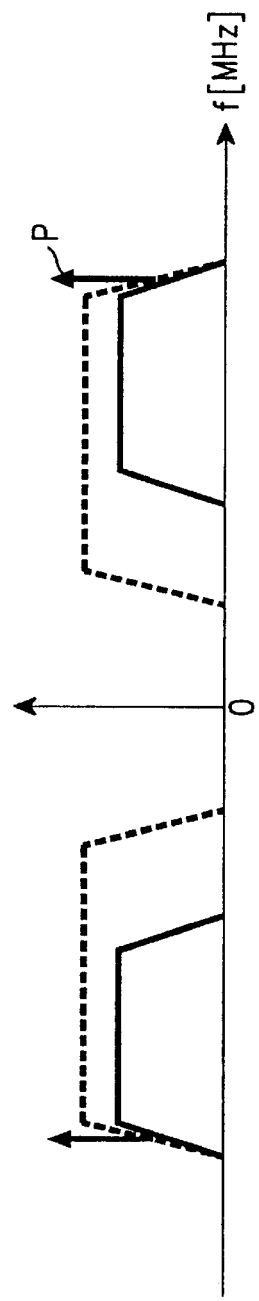

METHOD AND DEVICE FOR PRECISION TUNING, AND METHOD AND DEVICE FOR MATCHING VESTIGIAL SIDEBAND SIGNAL IN TELEVISION

BACKGROUND OF THE INVENTION

1. Field of the Invention

The present invention relates generally to a television, and in particular, to a method and device for precision tuning and a method and device for matching a vestigial sideband (VSB) signal in a television.

2. Description of the Related Art

VSB modulation is used in an 8-level HDTV (High Definition Television) based on the U.S. standard. Carrier recovery will be described referring to FIG. 1 which is a block diagram of a carrier recovery device in an American 8-level HDTV and FIG. 2 which shows the operational signal waveform in each component. Here, carrier recovery is a process of shifting a VSB signal of a channel to be tuned to a base band. A tuner receives a plurality of VSB signals in a radio frequency (RF) band through an antenna 100. The tuner 102 multiplies the plurality of VSB signals by a local frequency, first LO received from a synthesizer 104 which outputs a different first LO according to channel tuning, so that a VSB signal of a channel to be tuned among the plurality of VSB signals is shifted to an intermediate frequency (IF) band. Here, the frequency multiplied by the VSB signals of the RF band is called a tuning frequency.

For example, (a) of FIG. 2 shows a VSB signal of a channel among the plurality of VSB signals in the RF band. The VSB signal is between 174 and 180 MHz. The central frequency and bandwidth of the VSB signal are 177 MHz and 6 MHz, respectively. The VSB signal includes a pilot signal P at a location decreased from its maximum amplitude by 3 dB, that is, at 174.31 MHz. Here, the tuner 102 shifts the VSB signal to the IF band ranging from 41 to 47 MHz by multiplying the VSB signal by the tuning frequency, that is, the local frequency, the first LO. The IF band-shifted VSB signal is between 41 and 47 MHz and has a central frequency of 44 MHz, as shown in (b) of FIG. 2. The IF band-shifted VSB signal includes the pilot signal P at a location dropped from the maximum amplitude by 3dB, that is, at 46.69 MHz. The pilot signal P can be at 46.69 or 41.31 MHz according to the tuning frequency.

The above VSB signal is applied to a surface acoustic waveform (SAW) filter 106. The SAW filter band of the SAW filter 106 ranges from 41 to 47 MHz, where the IF band-shifted VSB signal is located. The SAW filter 106 passes only a signal within the SAW filter band, that is, the IF band-shifted VSB signal from the output of the tuner 102. The SAW filter 106 also drops the IF band-shifted VSB signal between ±0.31 MHz with respect to the pilot signal location by 3 dB. The SAW filter 106 drops the IF band-shifted VSB signal between ±0.31 MHz with respect to a location opposite to the pilot signal location by 3 dB. The opposite location is 41.31 MHz if the pilot signal is at 41.39 MHz, and vice versa. The SAW filter 106 drops the IF band-shifted VSB signal between ±0.31 MHz with respect to the pilot signal location and the opposite location by 3 dB in order to obtain entire flat frequency characteristics when the VSB signal is shifted to a base band. Here, as the VSB signal between ±0.31 MHz with respect to the pilot signal location drops by 3 dB, the pilot signal location in the VSB signal also falls by 3 dB. Therefore, the pilot signal is at a location dropped from the maximum amplitude by 6 dB in the output signal of the SAW filter 106.

Here, when the IF band-shifted VSB signal as shown in (b) of FIG. 2 is applied to the SAW filter 106, the SAW filter 106 passes only a signal within the SAW filter band and blocks the other signals (not shown). The SAW filter 106 drops the IF band-shifted VSB signal between ±0.31 MHz with respect to the pilot signal location and the opposite location by 3 dB, respectively. Thus, the output signal of the SAW filter 106 is in a frequency area ranging from 41 to 47 MHz and the pilot signal P is at the location dropped from the maximum amplitude by 6 dB in the output signal, as shown in (c) of FIG. 2.

The output of the SAW filter 106 is amplified in an IF amplifier 108 and then applied to first and second mixers 112 and 116. A reference oscillator 110 outputs a 10 local frequency, a third LO to be used for shifting the output signal of the SAW filter 106 to a base band. The third LO is fed to the first mixer 112. The phase of the third LO is shifted by 90° in a 90° phase shifter 114 and then the phase-shifted third LO is applied to the second mixer 116. The first mixer 112 shifts the output signal of the IF amplifier 108 to a base band by multiplying the output signal of the IF amplifier 108 by the third LO and outputs a quadrature phase signal Q. The second mixer 116 shifts the output signal of the IF amplifier 108 to the base band by multiplying the output signal of the IF amplifier 108 by the 90° phase-shifted third LO and outputs an in-phase signal I. The VSB signals I and Q shifted to the base band are illustrated in (d) of FIG. 2. The baseband-shifted VSB signals experience spectral overlapping between ±0.3 MHz with respect to 0 MHz, so that frequency characteristics are flat as shown in (d) of FIG. 2. Here, a pilot signal in the baseband-shifted VSB signal is at 0 MHz.

As described above, the conventional carrier recovery device uses the SAW filter 106 which passes a signal in the frequency band of an IF signal, that is, between 41 and 47 MHz. However, the frequency band of a VSB signal in a channel can be shifted according to a frequency offset. Thus, the frequency band of a VSB signal which shifts the VSB signal to the IF band may be shifted according to the frequency offset. Therefore, the frequency band of the IF band-shifted VSB signal shifts due to he frequency offset and beyond the SAW filter band between 41 and 47 MHz. The IF and-shifted VSB signal exceeding the SAW filter band is lost in the SAW filter 10, making it impossible to entirely shift the VSB signal to a base band.

Therefore, the carrier recovery device of FIG. 1 employs a frequency and phase looked loop (FPLL) 108 to thereby control the tuning frequency of the tuner 102 and compensate for the above frequency offset. The FPLL 118 is comprised of an AFC (Automatic Frequency Control) low pass filter 120, a limiter 122, a third mixer 124. an APC (Automatic Phase Control) low pass filter 126, and a VCO (Voltage Controlled Oscillator) 128. The baseband signal I is applied to the third mixer 124 through the AFC low pass filter 120 and the limiter 122. The third mixer 124 generates a direct current signal by multiplying the output signal of the limiter 122 by the baseband signal Q. The direct current signal is applied to the APC low pass filter 126 to control the VCO 128 such that the frequency offset is compensated for. The VCO 128 feeds a local frequency, a second LO for compensating for the frequency offset to the tuner 102. The tuner 102 controls the tuning frequency according to the second LO, thereby compensating for the frequency offset.

The above conventional carrier recovery device is configured in a long loop structure where the FPLL controls the tuning frequency of the tuner to prevent the decrease of carrier recovery performance due to the frequency offset. As a result, a long time is required to compensate for the frequency offset. In addition, the conventional carrier recovery device performs matching filtering by dropping the IF band-shifted VSB signal between ±0.31 MHz by 3 dB with respect to a pilot signal location and its opposite location by use of the SAW filter. Hence, the characteristics of the SAW filter seriously affects the performance of a receiver. Furthermore, the carrier recovery device operated in an analog scheme varies in performance with an analog device used and it is difficult to configure the entire receiver in ASICs (Application Specific Integrated Circuits). Therefore, many advanced appliance manufacturers employ a DFPLL (Digital Frequency and Phase Locked Loop) based on digital signal processing for a carrier recovery device.

FIG. 3 is a block diagram of a carrier recovery device having a structure which facilitates a carrier recovery block to be fabricated with a single IC, employing a DFPLL. In the carrier recovery device, a first oscillator 206 generates a fixed local frequency, a second LO and feeds the second LO to a tuner 202. The second LO being the oscillation frequency of the first oscillator 206 is set in consideration of an initial frequency offset of the tuner 202. The tuner 202 receives a plurality of VSB signals in an RF band through an antenna 200 and shifts a VSB signal of a channel to be tuned to an IF band based on the first LO and the second LO. An SAW filter 208 receives the IF band-shifted VSB signal from the tuner 202 and passes only a signal within a SAW filter band wide relative to the SAW filter band of the SAW filter 106 because the carrier recovery device of FIG. 3 cannot control the tuning frequency of the tuner 202 adaptively to the frequency offset. The output signal of the SAW filter 208 is amplified in an IF amplifier 210 and applied to a mixer 212. The mixer 212 multiplies the output signal of the IF amplifier 210 by the third LO received from a second oscillator 214, so that the output signal of the IF amplifier 210 is shifted to a frequency band which can be processed in an analog-to-digital (AD) converter 218. The output signal of the mixer 212 is applied to a low pass filter 216 and the low pass filter 216 removes harmonic components from the output signal of the mixer 212. The AD converter 218 converts the output signal of the low pass filter 216 to a digital signal and applies the digital signal to a carrier recovery unit 220.

The carrier recovery unit 220 includes a phase splitter 222, a first multiplier 224, a pilot divider 226, a second multiplier 228, a DFPLL 230, and an NCO (Numerically Controlled Oscillator) 232. The phase splitter 222 separates a complex signal from the output signal of the AD converter 218. The separated complex signal is multiplied by a local frequency, a fourth LO received from the NCO 232 through the first multiplier 224 and thus shifted to a base band. The baseband-shifted VSB signal is applied to a matching filter 234. The matching filter 234 drops the baseband-shifted VSB signal between ±0.31 MHz with respect to a location opposite to a pilot signal location by 3 dB. The pilot divider 226 separates the pilot signal from the output signal of the AD converter 218. The separated pilot signal is multiplied by the fourth LO received from the VCO 232 through the second multiplier 228 and thus shifted to a base band. The baseband-shifted pilot signal is applied to the DFPLL 230. The DFPLL 230 controls the NCO 232 to output the fourth LO for compensating for the degree to which the pilot signal deviates from 0 MHz.

The above carrier recovery device is of a short loop structure wherein the DFPLL 230 of the carrier recovery unit 220 controls the NCO 232 to compensate all frequencies. Therefore, a frequency offset is rapidly compensated for, signal processing is simple, and a PLL is very stable. However, since the carrier recovery device cannot control the tuning frequency of the tuner 202 adaptively to the frequency offset, as compared to the carrier recovery device of FIG. 1, it should set a wide SAW filter band for the SAW filter 208. This distorts a VSB signal when the VSB signal shifts to a base band.

The VSB signal distortion caused by the wide SAW filter band of the SAW filter 208 will be described in detail referring to FIG. 4 which illustrates the operational waveforms of the carrier recovery device shown in FIG. 3. As shown in (a) of FIG. 4, the SAW filter band is designed to be so wide that an IF band-shifted VSB signal can shift by a frequency offset but within the SAW filter band. Thus, the SAW filter 208 cannot implement the matching filtering of dropping the IF band-shifted VSB signal between ±0.31 MHz with respect to the location of the pilot signal P by 3 dB. That is, as shown in (b) of FIG. 4 illustrating the output signal of the SAW filter 208, the pilot signal P is still at a location dropped from a maximum amplitude by 3 dB in the output signal of the SAW filter 208. Referring to (c) of FIG. 4, a boost-up takes place between ±0.31 MHz with respect to 0 MHz with a spectral overlap. This is because the IF band-shifted VSB signal between ±0.31 MHz with respect to the location of a pilot signal P has not dropped by 3 dB. A signal boosted up between ±0.3 MHz with respect to the pilot signal location is applied to the matching filter 234. However, since the matching filter 234 matching-filters only the IF band-shifted VSB signal between ±0.31 MHz with respect to the location opposite to the pilot signal location, a boost-up still takes place in the vicinity of 0 MHz of the baseband-shifted VSB signal. As stated above, when the VSB signal shifts to a base band, a boost-up, that is, a direct current boost-up occurs in the vicinity of 0 MHz.

As described above, the carrier recovery device of a short loop structure using a digital signal processing-based DFPLL is designed to have a wide SAW filter bandwidth. Hence, when a VSB signal is shifted to a base band, a direct current boost-up occurs.

SUMMARY OF THE INVENTION

It is, therefore, an object of the present invention to provide a device and method for precision tuning and a device and method for matching a VSB signal in a television, which prevents a direct current boost-up when a VSB signal is shifted to a base band in a carrier recovery device of a short loop structure using a digital signal processing-based DFPLL.

The above object is achieved by providing a precision tuning method in a television includes the steps of receiving a plurality of vestigial sideband signals in a radio frequency band, shifting only a vestigial sideband signal of an intended channel to be tuned among the plurality of vestigial sideband signals to a base band, outputting the baseband-shifted vestigial sideband signal, generating a direct current estimated value by taking an average of the baseband-shifted vestigial sideband signal, and controlling a tuning frequency of a tuner based on the direct current estimated value.

BRIEF DESCRIPTION OF THE DRAWINGS

The above and other objects, features and advantages of the present invention will become more apparent from the following detailed description when taken in conjunction with the accompanying drawings in which:

FIG. 1 is a block diagram of a conventional carrier recovery device based on an analog scheme;

FIG. 8 illustrates the operational waveforms of the carrier recovery device shown in FIG. 5.

DETAILED DESCRIPTION OF THE PREFERRED EMBODIMENT

A preferred embodiment of the present invention will be described hereinbelow with reference to the accompanying drawings. While many details are provided for comprehensive understanding of the present invention, they are exemplary and thus the present invention is not limited to them. In the following description, well-known functions or constructions are not described in detail since they would obscure the invention in unnecessary detail.

Figure 5:
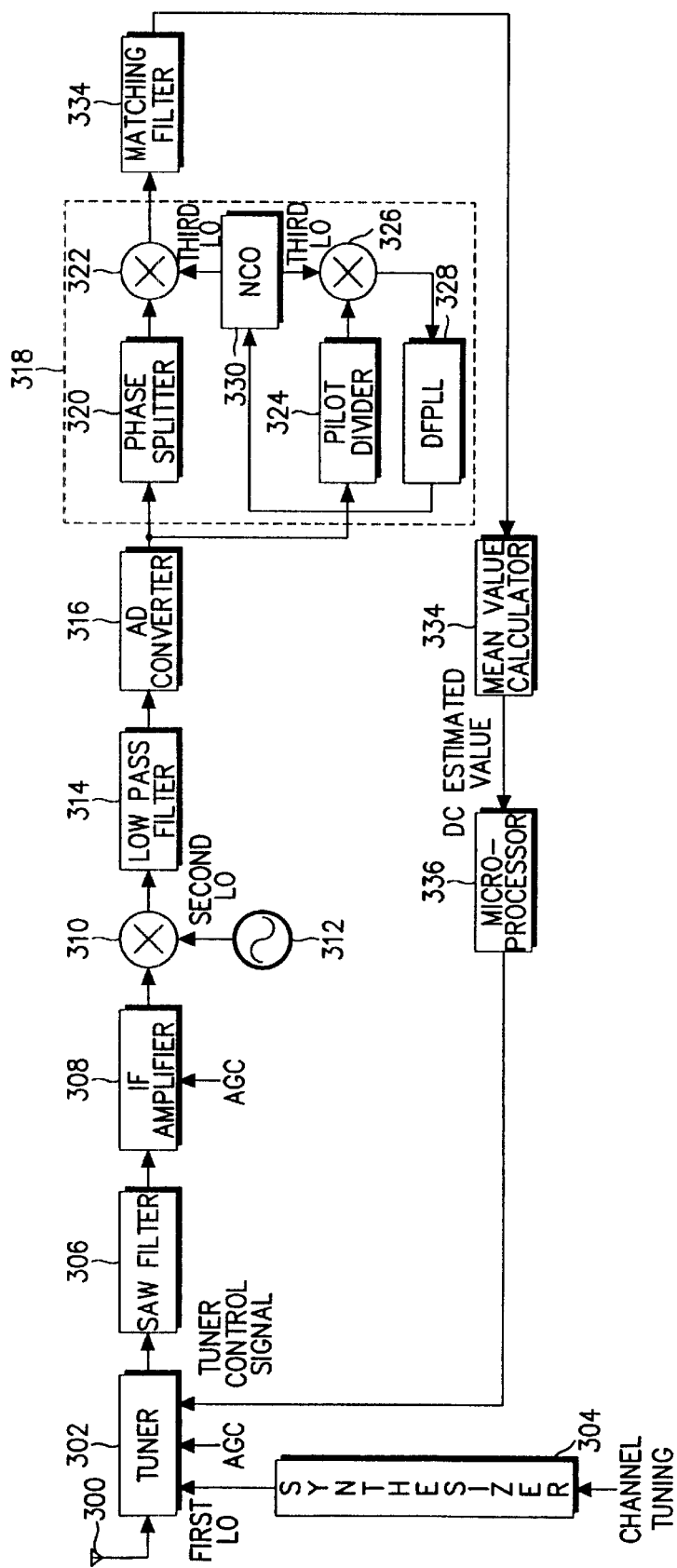
FIG. 5 is a block diagram of a carrier recovery device according to a preferred embodiment of the present invention.

Referring to FIG. 5 being a block diagram of a carrier recovery device according to a preferred embodiment of the present invention, a tuner 302 receives a plurality of VSB signals in an RF band through an antenna 300. The tuner 302 has an AFT (Automatic Fine Tuning) function, for controlling a tuning frequency according to a tuner control signal. The tuner 302 shifts a VSB signal of an intended channel to be tuned to an IF band by multiplying the plurality of VSB signals in the RF bad by the first LO received from a synthesizer 304, and feeds the IF band-shifted VSB signal to an SAW filter 306. The SAW filter 306 passes only a VSB signal within an SAW filter band. The SAW filter band is set to be narrow as shown in (a) of FIG. 8 or wide as shown in (b) of FIG. 8, as far as one portion of the SAW filter band should be set to drop the VSB signal between ±0.31 MHz with respect to the location of the pilot signal P by 3 dB.

Thus, the SAW filter 306 drops the VSB signal of the SAW filter band between ±0.31 MHz with respect to the pilot signal location by 3 dB, while passing the VSB signal. The output signal of the SAW filter 306 is amplified by an IF amplifier 308 and then applied to a mixer 310. The mixer 310 mixes the output signal of the IF amplifier 308 with the second LO received from a first oscillator 312, thereby shifting the output signal of the IF amplifier 308 to a frequency band which can be processed in an AD converter 316. The output of the mixer 310 is applied to a low pass filter 314 and the low pass filter 314 removes harmonic components from the output of the mixer 310. The AD converter 316 converts the output of the low pass filter 314 to a digital signal and feeds the digital signal to a carrier recovery unit 318.

Figure 2C:
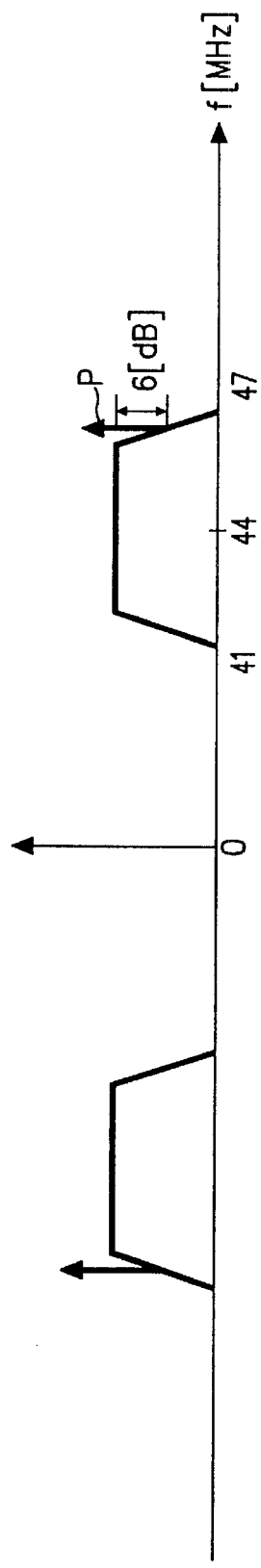
FIG. 2 illustrates the operational waveforms of the carrier recovery device shown in FIG. 1.
Figure 2D:
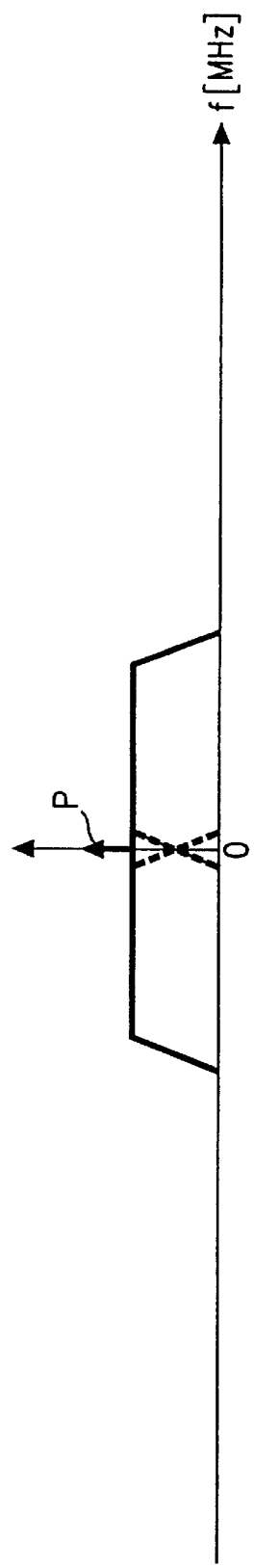
Figure 3:
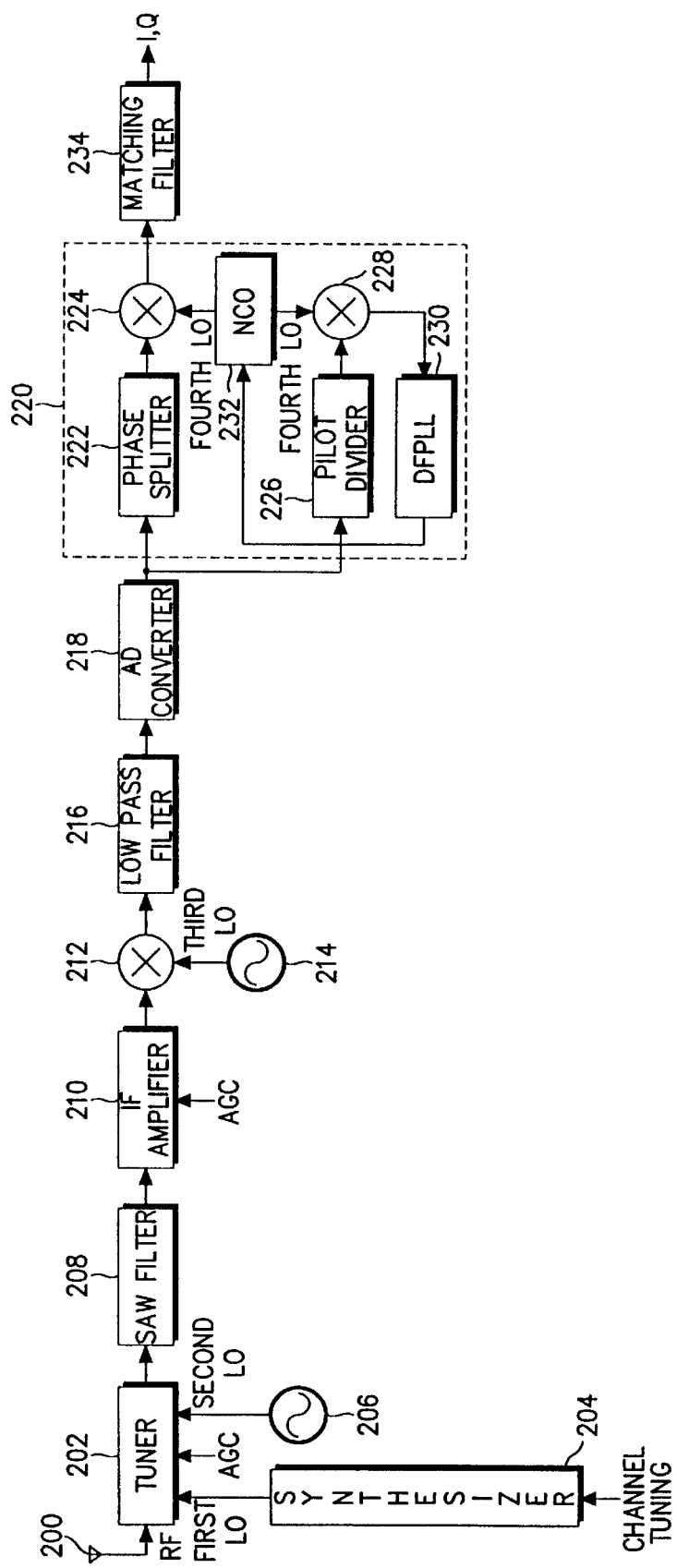
FIG. 3 is a block diagram of a conventional carrier recovery device based on a digital scheme.
Figure 4A:
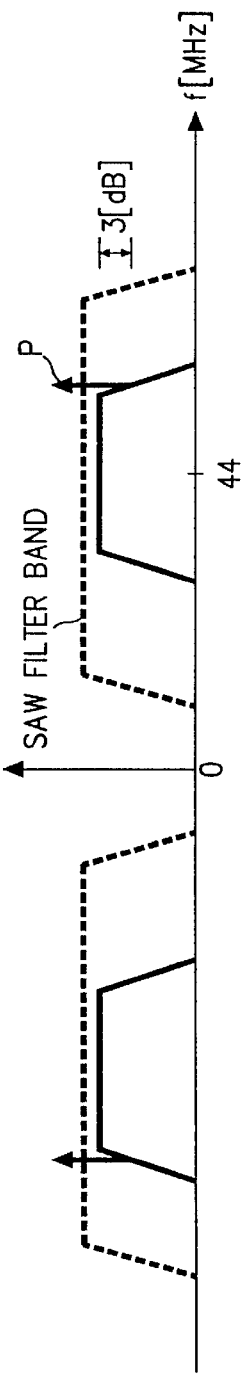
FIG. 4 illustrates the operational waveforms of the carrier recovery device shown in FIG. 3.
Figure 4B:
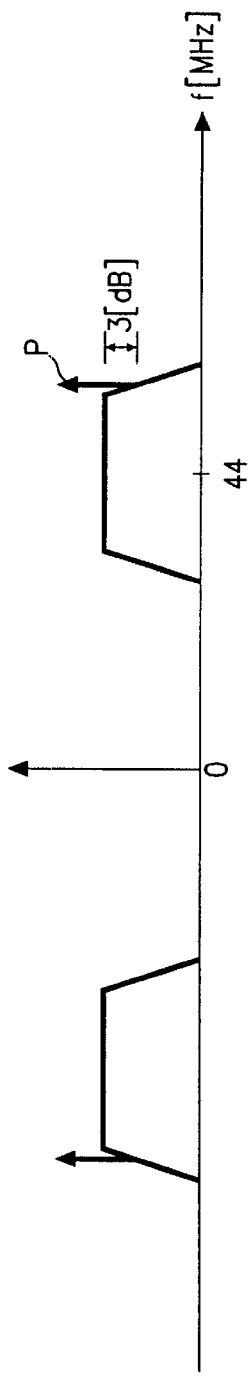
Figure 4C:
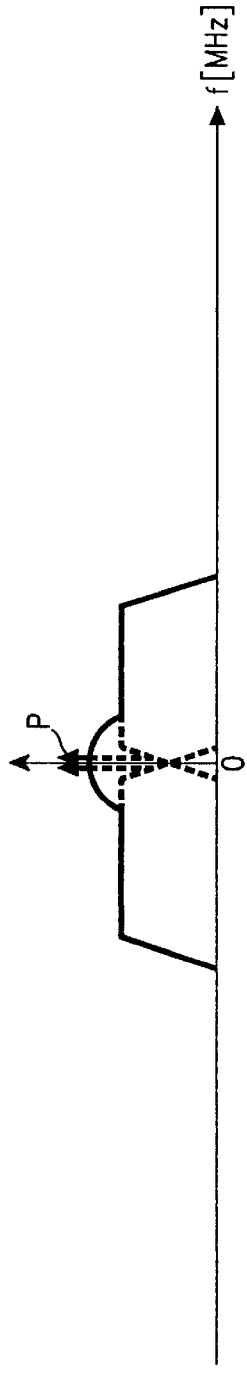

The carrier recovery unit 318 includes a phase splitter 320, a first multiplier 322. a pilot divider 324, a second multiplier 328, a DFPLL 230, and an NCO 232. The carrier recovery unit 318 is the same in configuration and operation as the conventional carrier recovery unit shown in FIG. 3. A matching filter 332 receives a baseband-shifted VSB signal from the carrier recovery unit 318. The matching filter 332 performs the matching filtering of dropping signals I and Q between ±0.31 MHz with respect to a location opposite to the pilot signal location by 3 dB. The matching filter 332 is designed to have the same frequency characteristic as a square root cosine filter having a roll-off value of 0.1152. The output signal of the matching filter 332 is a final baseband-shifted VSB signal. The output signal of the matching filter 332 is applied to a mean value calculator 334. The mean value calculator 334 takes an average of the output signal of the matching filter 332, thereby converting the output signal of the matching filter 332 to a direct current estimated value.

Figure 7:
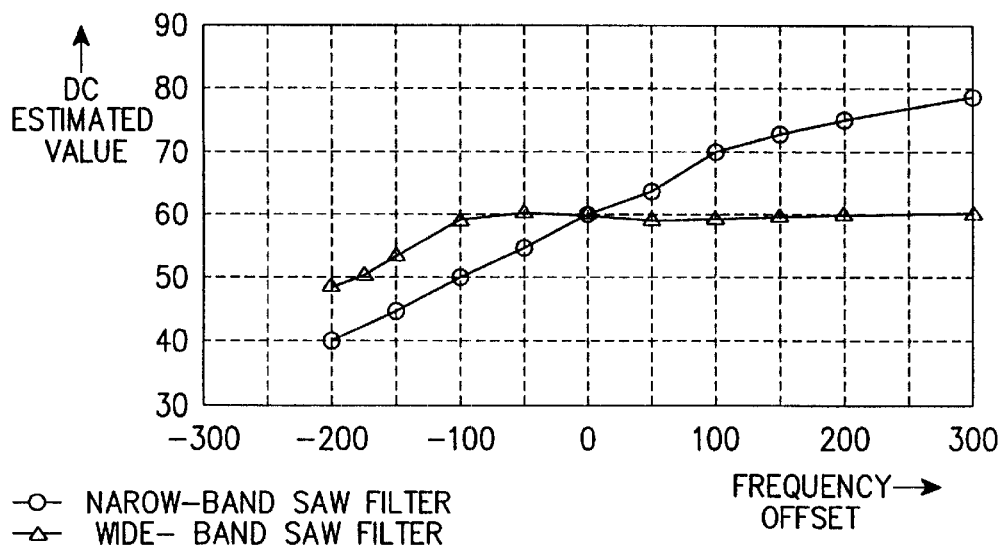
FIG. 7 illustrates variations of a direct current estimated value with respect to a frequency offset.

The direct current estimated value of the output signal of the matching filter 332 varies with a frequency offset. Referring to FIG. 7 illustrating variations of the direct current estimated value with the frequency offset, the direct current estimated value increases on the whole as the frequency offset increases. The direct current estimated value is different depending on whether the SAW filter band of the SAW filter 306 is wide or narrow. In the case of a wide SAW filter band of the SAW filter 306, since the loss of an IF signal caused by a frequency offset is small, the direct current estimated value slowly increases with the increase of the frequency offset. In the case of a narrow SAW filter band of the SAW filter 306, since the loss of an IF signal caused by a frequency offset is large, the direct current estimated value rapidly increases with the increase of the frequency offset. Here, the loss of the IF signal is compensated for by automatic gain control (AGC) and thus the direct current estimated value increases rapidly with the increase of the frequency offset when the SAW filter band is narrow. A direct current estimated value in the absence of a frequency offset can be obtained from the above relationship.

Therefore, a designer sets an allowable frequency offset range using the above relationship. Then, he sets a direct current estimated value from the lowest limit of the allowable frequency offset range as a first reference and a direct current value from the highest limit of the allowable frequency offset range as a second reference, and feeds the first and second references to a microprocessor 336. The microprocessor 336 applies a tuner control signal for compensating for a frequency offset using the first and second references and the direct current estimated value received from the mean value calculator 334 to the tuner 302.

Figure 6:
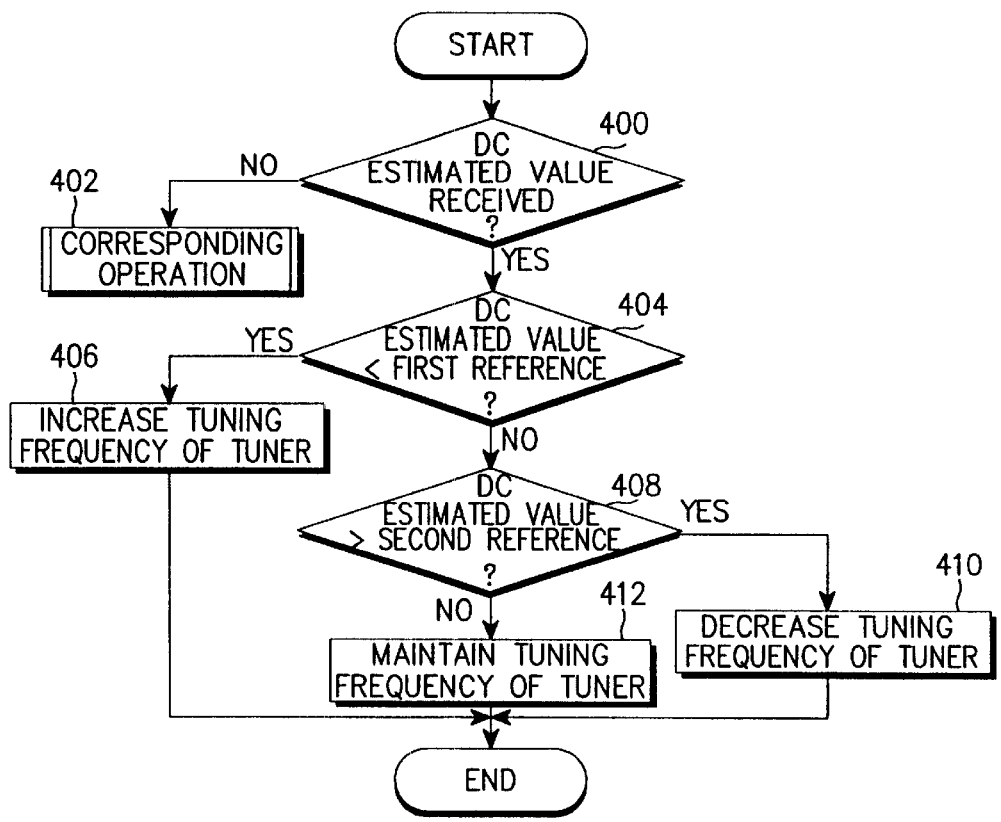
FIG. 6 is a flowchart depicting an operation of a microprocessor shown in FIG. 5.

Referring to FIG. 6 which is a flowchart depicting an operation of the microprocessor 336 for compensating for a frequency offset using the first and second references and a direct current estimated value received from the mean value calculator 334, the microprocessor 336 determines whether the direct current value has been received from the mean value calculator 334 in step 400. Upon receipt of the direct current estimated value, the microprocessor 336 goes to step 404, and otherwise, it goes to step 402 to perform a corresponding operation. In step 404, the microprocessor 336 determines whether the direct current estimated value is less than the first reference. If the direct current estimated value received from the mean value calculator 334 is less than the first reference, the microprocessor 336 generates a tuner control signal for increasing the tuning frequency of the tuner 302 and feeds the tuner control signal to the tuner 302. The tuner 302 increases the tuning frequency, compensating for the frequency offset. Then, if the direct current estimated value is greater than the first reference, the microprocessor 336 determines whether the direct current estimated value is greater than the second reference in step 408. If the direct current estimated value is greater than the second reference, the microprocessor 336 generates a tuner control signal for decreasing the tuning frequency of the tuner 302 and feeds the tuner control signal to the tuner 302. Then, the tuner 302 decreases the tuning frequency, compensating for the frequency offset. If the direct current estimated value is between the first and second references, the microprocessor 336 generates a tuner control signal for maintaining the tuning frequency of the tuner at the current level and feeds the tuner control signal to the tuner 302 in step 412. Then, the tuner 302 maintains the current tuning frequency.

In accordance with the present invention as described above, the SAW filter drops the IF band-shifted VSB signal between ±0.31 MHz with respect to the location of the pilot signal by 3 dB and then shifts the VSB signal to a base band. The SAW filter drops the baseband-shifted VSB signal between ±0.31 MHz with respect to the location opposite to the pilot signal location by 3 dB and outputs a final baseband-shifted VSB signal. The direct current estimated value of the baseband-shifted VSB signal varies with a frequency offset and the tuning frequency of the tuner is controlled according to the direct current estimated value, thereby compensating for the frequency offset. Therefore, the present invention is advantageous in that the direct current boost-up encountered in a carrier recovery device of a short loop using a DFPLL can be removed by adaptively controlling the tuning frequency of the tuner according to the frequency offset in the carrier recovery device.

As described above, the present invention has the advantage that no direct current boost-up occurs when a VSB signal is shifted to a base band in a carrier recovery device of a short loop using a digital signal processing-based DFPLL.

What is claimed is:

1. A precision tuning method in a television, comprising the steps of:
    receiving a plurality of vestigial sideband signals in a radio frequency band, shifting only a vestigial sideband signal of an intended channel to be tuned among the plurality of vestigial sideband signals to a base band, and outputting the baseband-shifted vestigial sideband signal;
    generating a direct current estimated value by taking an average of the baseband-shifted vestigial sideband signal; and
    controlling a tuning frequency of a tuner based on the direct current estimated value.

2. A precision tuning device in a television, comprising:
    a tuner for receiving a plurality of vestigial sideband signals in a radio frequency band through an antenna, shifting a vestigial sideband signal of an intended channel to be tuned to an intermediate frequency band by multiplying the plurality of vestigial sideband signals by a tuning frequency, and outputting the intermediate frequency band-shifted vestigial signal;
    a vestigial sideband signal processor for shifting only a vestigial sideband signal in a predetermined intermediate frequency band from the intermediate frequency band-shifted vestigial sideband signal to a base band;
    a mean value calculator for generating a direct current estimated value by taking an average of the baseband-shifted vestigial sideband signal; and
    a microprocessor for controlling the tuning frequency of the tuner based on the direct current estimated value.

3. A precision tuning method in a television, comprising the steps of:
    receiving a plurality of vestigial sideband signals in a radio frequency band, shifting only a vestigial sideband signal of an intended channel to be tuned among the plurality of vestigial sideband signals to a base band, and outputting the baseband-shifted vestigial sideband signal;
    generating a direct current estimated value by taking an average of the baseband-shifted vestigial sideband signal;
    determining whether the direct current estimated value is within a direct current estimated value range corresponding to an allowable frequency offset range;
    maintaining a tuning frequency of a tuner at a current level if the direct current estimated value is within the direct current estimated value range corresponding to the allowable frequency offset range; and
    controlling the tuning frequency of the tuner if the direct current estimated value deviates from the direct current estimated value range corresponding to the allowable frequency offset range.

4. A precision tuning method in a television, comprising the steps of:
    receiving a plurality of vestigial sideband signals in a radio frequency band, and shifting a vestigial sideband signal of an intended channel to be tuned to an intermediate frequency band by multiplying the plurality of vestigial sideband signals by a tuning frequency;
    filtering only a vestigial sideband signal in a predetermined intermediate frequency band from the intermediate frequency band-shifted vestigial sideband signal, while matching-filtering the intermediate frequency band-shifted vestigial sideband signal in a predetermined range with respect to the location of a pilot signal;
    shifting the filtered vestigial sideband signal to a base band;
    matching-filtering the baseband-shifted vestigial sideband signal in a predetermined range with respect to a location opposite to the pilot signal location;
    generating a direct current estimated value by taking an average of the matching-filtered baseband-shifted vestigial sideband signal;
    increasing the tuning frequency if the direct current estimated value is less than the lowest limit of a direct current estimated value range corresponding to an allowable frequency offset range;
    decreasing the tuning frequency if the direct current estimated value is greater than the highest limit of the direct current estimated value range corresponding to the allowable frequency offset range; and
    maintaining the tuning frequency at a current level if the direct current estimated value is within the direct current estimated value range corresponding to the allowable frequency offset range.

5. A precision tuning device in a television, comprising:
    a tuner for receiving a plurality of vestigial sideband signals in a radio frequency band, and shifting a vestigial sideband signal of an intended channel to be tuned to an intermediate frequency band by multiplying the plurality of vestigial sideband signals by a tuning frequency;
    a surface acoustic waveform filter for receiving the output of the tuner and filtering the vestigial sideband signal of the intermediate frequency band, while matching-filtering the intermediate frequency band-shifted vestigial sideband signal in a predetermined range with respect to the location of a pilot signal;

a mixer for multiplying the output of the surface acoustic waveform by a frequency to shift the output of the surface acoustic waveform filter to a frequency band which can be processed in an analog to digital converter;

the analog to digital converter for converting the output of the mixer to a digital signal;

a vestigial sideband signal processor for receiving the output of the analog to digital converter and shifting the vestigial sideband signal to a base band;

a matching filter for matching-filtering the baseband-shifted vestigial sideband signal in a predetermined range with respect to a location opposite to the pilot signal location;

a mean value calculator for generating a direct current estimated value by taking an average of the output of the matching-filter; and a microprocessor for generating a tuner control signal for maintaining a tuning frequency of the tuner at a current level if the direct current estimated value is within a direct current estimated value range corresponding to an allowable frequency offset range and controlling the tuning frequency of the tuner if the direct current estimated value deviates from the direct current estimated value range corresponding to the allowable frequency offset range.

6. A precision tuning device in a television, comprising:

a tuner for receiving a plurality of vestigial sideband signals in a radio frequency band, and shifting a vestigial sideband signal of an intended channel to be tuned to an intermediate frequency band by multiplying the plurality of vestigial sideband signals by a tuning frequency;

a surface acoustic waveform filter for receiving the output of the tuner and filtering the vestigial sideband signal of the intermediate frequency band, while matching-filtering the intermediate frequency band-shifted vestigial sideband signal in a predetermined range with respect to the location of a pilot signal;

a mixer for multiplying the output of the surface acoustic waveform by a frequency to shift the output of the surface acoustic waveform filter to a frequency band which can be processed in an analog to digital converter;

a low pass filter for low-pass-filtering the output of the mixer;

the analog to digital converter for converting the output of the low pass filter to a digital signal;

a vestigial sideband signal processor for receiving the output of the analog to digital converter and shifting the vestigial sideband signal to a base band;

a matching filter for matching-filtering the baseband-shifted vestigial sideband signal in a predetermined range with respect to a location opposite to the pilot signal location;

a mean value calculator for generating a direct current estimated value by taking an average of the output of the matching-filter; and a microprocessor for generating a tuner control signal for maintaining a tuning frequency of the tuner at a current level if the direct current estimated value is within a direct current estimated value range corresponding to an allowable frequency offset range and controlling the tuning frequency of the tuner if the direct current estimated value deviates from the direct current estimated value range corresponding to the allowable frequency offset range.

7. A vestigial sideband signal matching method in a television, comprising the steps of:

matching-filtering a vestigial sideband signal of an intermediate frequency band in a predetermined range with respect to the location of a pilot signal;

shifting the intermediate frequency band-shifted vestigial sideband signal to a base band; and matching-filtering the baseband-shifted vestigial sideband signal in a predetermined range with respect to a location opposite to the pilot signal location.

8. A vestigial sideband signal matching device in a television, comprising:

a surface acoustic filter for filtering a vestigial sideband signal in an intermediate frequency band, while matching-filtering the vestigial sideband signal in a predetermined range with respect to the location of a pilot signal;

a carrier recovery unit for shifting the intermediate frequency band-shifted vestigial sideband signal to a base band; and a matching filter for matching-filtering the baseband-shifted vestigial sideband signal in a predetermined range with respect to a location opposite to the pilot signal location.

* * * * *